United States Patent
Flasch

(10) Patent No.: US 7,360,502 B2
(45) Date of Patent: Apr. 22, 2008

(54) SAND SIFTING/CLEANING DEVICE FOR AN AQUARIUM

(76) Inventor: Gregory J. Flasch, 3011 Paul St., Cincinnati, OH (US) 45208

( * ) Notice: Subject to any disclaimer, the term of this patent is extended or adjusted under 35 U.S.C. 154(b) by 302 days.

(21) Appl. No.: 11/246,630

(22) Filed: Oct. 11, 2005

(65) Prior Publication Data

US 2007/0079764 A1 Apr. 12, 2007

(51) Int. Cl.
*A01K 63/04* (2006.01)

(52) U.S. Cl. ..................................... 119/259

(58) Field of Classification Search ............... 119/200, 119/259, 264; 210/169, 232, 416.2, 416.1, 210/767, 780, 470, 248
See application file for complete search history.

(56) References Cited

U.S. PATENT DOCUMENTS

| | | | |
|---|---|---|---|
| 3,734,853 A | 5/1973 | Horvath | |
| 3,765,432 A * | 10/1973 | Goodin | 134/168 R |
| 3,794,052 A * | 2/1974 | Koble et al. | 134/167 R |
| 4,094,788 A | 6/1978 | Dockery | |
| 4,374,024 A * | 2/1983 | Peloquin et al. | 210/241 |
| D282,016 S | 12/1985 | Chestnut | |
| 4,797,206 A * | 1/1989 | Lynch | 210/167.16 |
| 5,279,730 A * | 1/1994 | Chen | 210/167.23 |
| 5,655,245 A * | 8/1997 | Bunch | 15/1.7 |
| 5,695,654 A * | 12/1997 | Schultz | 210/780 |
| 5,730,068 A * | 3/1998 | Rioux, Jr. | 108/99 |
| 5,975,022 A * | 11/1999 | Miller | 119/264 |
| 6,499,432 B2 * | 12/2002 | Ogawa | 119/264 |
| 6,878,267 B1 * | 4/2005 | Mandia | 210/167.21 |
| 6,979,400 B2 * | 12/2005 | Bauckman et al. | 210/167.1 |
| 7,090,769 B1 * | 8/2006 | Peterson et al. | 210/167.16 |

* cited by examiner

*Primary Examiner*—Thomas Price
(74) *Attorney, Agent, or Firm*—Donald R. Schoonover

(57) ABSTRACT

An accessory for a cleaning apparatus for an aquarium having a granular substance covering a bottom surface of the aquarium including a rigid handle having a handle distal end and a handle proximal end wherein the handle is hollow such that fluid can freely flow therethrough from the handle distal end to the handle proximal end, and a connecting portion structured and configured to connect the handle proximal end in fluid flow communication with the cleaning apparatus; an input device having a longitudinal channel therethrough, a device proximal end, and a device distal end, wherein the device proximal end is releasably securable to the handle distal end of the handle; and at least one stirring element extending longitudinally outwardly from the device distal end of the input device.

2 Claims, 1 Drawing Sheet

SAND SIFTING/CLEANING DEVICE FOR AN AQUARIUM

BACKGROUND OF THE INVENTION

1. Field of the Invention

The present invention relates to aquariums and, more specifically without limitation, to accessories for aquariums.

2. Description of the Related Art

People love pets. This is evidenced by the fact that the average amount spent on pet supplies has more than doubled since 2001. In many homes, animals are treated as family members, and their health and well-being are of primary concern to their owners. As pets become a part of the family, owners are always looking for new and innovative ways to keep their pets healthy and happy.

When most people hear the word "pet," they immediately think of dogs or cats, but there are a number of different types of animals that people keep as pets. Some people keep birds. Birds add beauty with their colored plumage and are also prized for their ability to talk or their melodious singing, depending on the type of bird. Other people like more exotic pets such as snakes or lizards. Gerbils, hamsters, and rabbits are frequent pet requests of children.

One type of pet that is found in many homes is fish. Most people find watching fish to be relaxing and calming, and many people keep a fish tank in their home. Many varieties of fish are relatively low maintenance, but it is of utmost importance that a fish tank be properly maintained. Proper maintenance includes regular filter changes and cleaning of the tank walls and substrate materials on a regular basis.

Many people use an aquarium vacuum to clean debris off the aquarium gravel, colored rocks, and coral that are used to line the bottom of the aquarium. Unfortunately, a drawback to aquarium vacuums is that they are only effective at removing debris resting on top of the substrate material. If the wand used for vacuuming is allowed to touch or closely approach the substrate material, the substrate material is sucked into the vacuum along with the debris.

What is needed is a sand/sifter cleaner device for an aquarium which prevents sand and other granular substrates from being sucked into an aquarium cleaning apparatus.

SUMMARY OF THE INVENTION

Principal Objects and Advantages of the Invention

The principal objects and advantages of the present invention include: providing a sand sifting/cleaning device for an aquarium which prevents sand and other granular substrates from being sucked into an aquarium cleaning apparatus; and generally providing such a sand sifting/cleaning device that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

Figure 1:
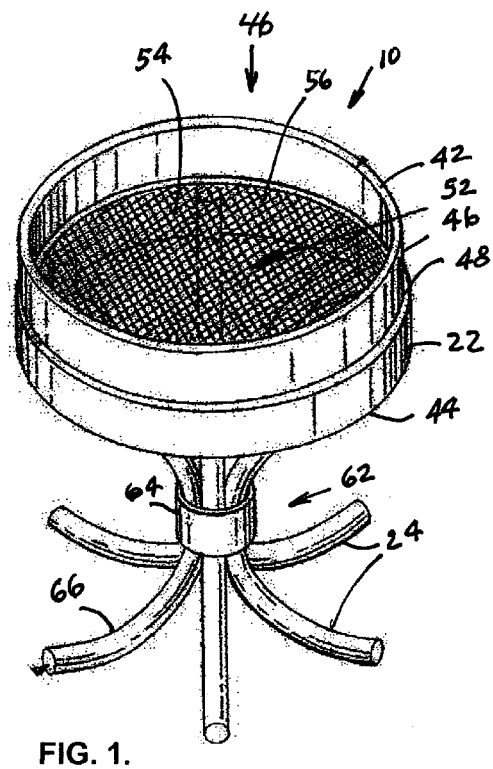
FIG. 1 is a perspective view of a sand sifting/cleaning device for an aquarium in accordance with the present invention.
Figure 3:
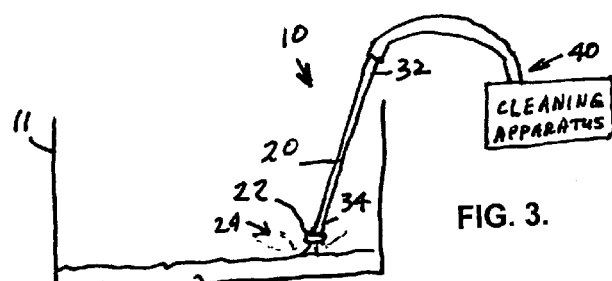
FIG. 3 is a reduced side elevational view showing the sand sifting/cleaning device for an aquarium in use, in accordance with the present invention.
Figure 2:
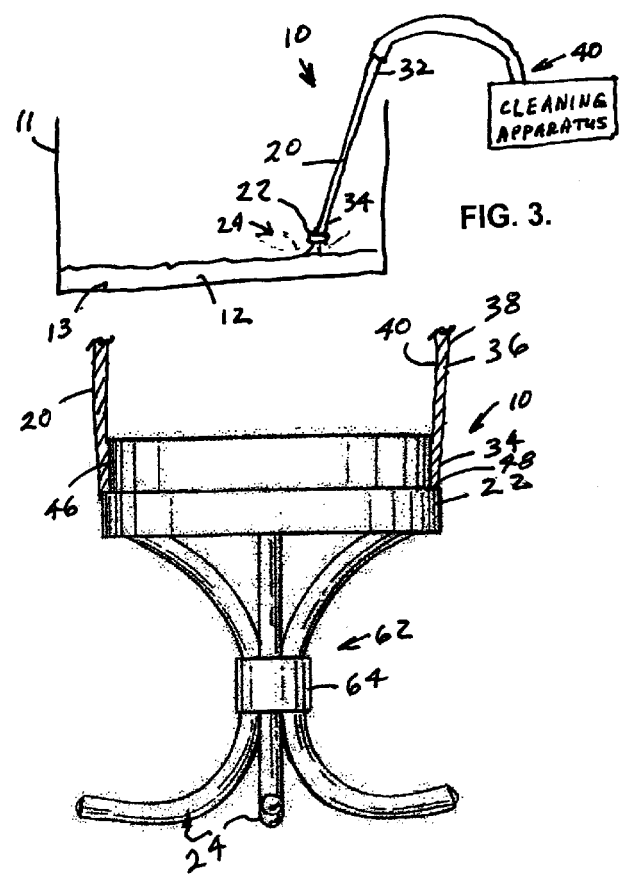
FIG. 2 is a side elevational view of the sand sifting/cleaning device for an aquarium in accordance with the present invention.

The reference numeral 10 generally refers to a sand sifting/cleaning device for an aquarium 11, wherein the aquarium has a granular substance 12 covering a bottom surface 13 thereof, in accordance with the present invention as shown in FIGS. 1 through 3. The sand sifting/cleaning device 10 includes a handle 20, an input device 22, and at least one stirring element 24.

The handle 20 is constructed of rigid material and has a handle proximal end 32, a handle distal end 34, and a cylindrically shaped sidewall 36 with an outer surface 38 and an inner surface 40 such that fluid can freely flow therethrough from the handle distal end 34 to the handle proximal end 32. The handle proximal end 32 is structured and configured to be operatively connectable in fluid flow communication with the cleaning apparatus 40.

The input device 22 has a device proximal end 42, a device distal end 44, and a channel 46 therethrough such that fluid can freely flow through the input device 22 from the device distal end 44 to the device proximal end 42. The device proximal end 42 is structured to form a fluid-tight seal with the handle distal end 34.

For example, the device proximal end 42 may have a cylindrically shaped insertion portion 46 and a shoulder 48 spaced adjacently to the insertion portion 46 as shown in FIG. 2. The insertion portion 46 is dimensioned such that the device proximal end 42 can be slidably and telescopically inserted into the handle distal end 34 such that a fluid-tight seal is frictionally established between the insertion portion 46 and the inner surface 40 of the handle 20 and the handle distal end 34 is in abutting engagement with the shoulder 48.

The input device 22 may include a filter device 52 mounted internally within, and completely spanning the channel 46 through, the input device 22. For example, the filter device 52 may include a screen 54 with mesh openings 56 which are dimensioned to be large enough to allow waste and uneaten food particles in, on and stirred up from the granular substance to pass therethrough, but which are dimensioned to be small enough to prevent the granular substance from passing therethrough. If desired, the filter device 52 may be removable for cleaning purposes.

The at least one stirring element 24 extends longitudinally outwardly from the device distal end 44 of the input device 22. In FIGS. 1 and 2, the at least one stirring element 24 is shown to include a plurality of arcuately shaped stirring elements 24. Preferably, each stirring element 24 has an outer surface 66 constructed of soft, non-abrasive material. Also preferably, each of the plurality of stirring elements 24 has a central portion 62 spaced in a side by side arrangement with the central portion 62 of each of the other stirring elements 24 of the plurality of stirring elements 24 and wherein a band 64 encircles the side by side arrangement at the central portions 62 of the plurality of stirring elements 24.

The input device 22 and the at least one stirring element 24 are dimensioned and spaced such that the magnitude of suctioning operably provided below the input device 22 by the cleaning apparatus 40 is sufficient to pull waste and uneaten food particles in, on and stirred up from the granular substance through the input device 22 but is not sufficient to pull the granular substance 12 through the input device 22.

In an application of the sand sifting/cleaning device for an aquarium, the handle is used to connect the input device to the cleaning apparatus. After activating the cleaning apparatus, the handle is used to cause the stirring elements to pass through the granular substance and cause debris and contaminating material to be entrained in the water near the bottom of the aquarium. That debris and contaminating material is then suctioned through the handle into the cleaning apparatus.

It is to be understood that while certain forms of the present invention have been illustrated and described herein, it is not to be limited to the specific forms or arrangement of parts as described and shown.

What is claimed and desired to be covered by Letters Patent is:

1. An accessory for a cleaning apparatus for an aquarium having a granular substance covering a bottom surface of the aquarium, the accessory comprising:
   (a) a rigid handle having:
      (1) a handle distal end and a handle proximal end, the handle being hollow such that fluid can freely flow therethrough from the handle distal end to the handle proximal end, and
      (2) a connecting portion structured and configured to connect the handle proximal end in fluid flow communication with the cleaning apparatus;
   (b) an input device having a longitudinal channel therethrough, a device proximal end, and a device distal end, wherein the device proximal end is releasably securable to the handle distal end of the handle, the input device including a shoulder that operatively abuts the handle distal end and wherein the device proximal end is frictionally and releasably securable to the handle distal end;
   (c) a filter device mounted internally within, and completely spanning, the channel through, the input device, the filter device including a screen with mesh openings dimensioned small enough to prevent the granular substance from passing therethrough but dimensioned large enough to allow waste and uneaten food particles in, on and stirred up from the granular substance to pass therethrough; and
   (d) a plurality of arcuately shaped stirring elements extending longitudinally outwardly from the device distal end of the input device, each of the plurality of stirring elements having a central portion spaced in a side by side arrangement with the central portion of each of the other stirring elements of the plurality of stirring elements, the plurality of stirring element further including a band encircling the side by side arrangement at the central portions of the plurality of stirring elements; and
   (e) wherein the input device and the plurality of stirring elements are dimensioned and spaced such that the magnitude of suctioning operably provided therethrough by the cleaning apparatus is sufficient to pull waste and uneaten food particles in, on and stirred up from the granular substance through the input device but is not sufficient to pull the granular substance through the input device.

2. An accessory for a cleaning apparatus for an aquarium having a granular substance covering a bottom surface of the aquarium, the accessory comprising:
   (a) a rigid handle having:
      (1) a handle distal end and a handle proximal end, the handle being hollow such that fluid can freely flow therethrough from the handle distal end to the handle proximal end, and
      (2) a connecting portion structured and configured to connect the handle proximal end in fluid flow communication with the cleaning apparatus;
   (b) an input device having a longitudinal channel therethrough, a device proximal end, and a device distal end, wherein the device proximal end is releasably securable to the handle distal end of the handle; and
   (c) a plurality of arcuately shaped stirring elements extending longitudinally outwardly from the device distal end of the input device, wherein each of the plurality of stirring elements has a central portion spaced in a side by side arrangement with the central portion of each of the other stirring elements of the plurality of stirring elements, the plurality of stirring elements further including a band encircling the side by side arrangement at the central portions of the plurality of stirring elements.

* * * * *